Sept. 26, 1950 H. J. SIEKMANN ET AL 2,523,397
CHANGE SPEED GEARING FOR LATHE HEADSTOCKS
Filed Sept. 10, 1948 5 Sheets-Sheet 1

INVENTORS.
HAROLD J. SIEKMANN AND
GEORGE J. KASSELMANN
BY
ATTORNEY

INVENTORS.
HAROLD J. SIEKMANN AND
GEORGE J. KASSELMANN.
BY
Willard L. Groene
ATTORNEY

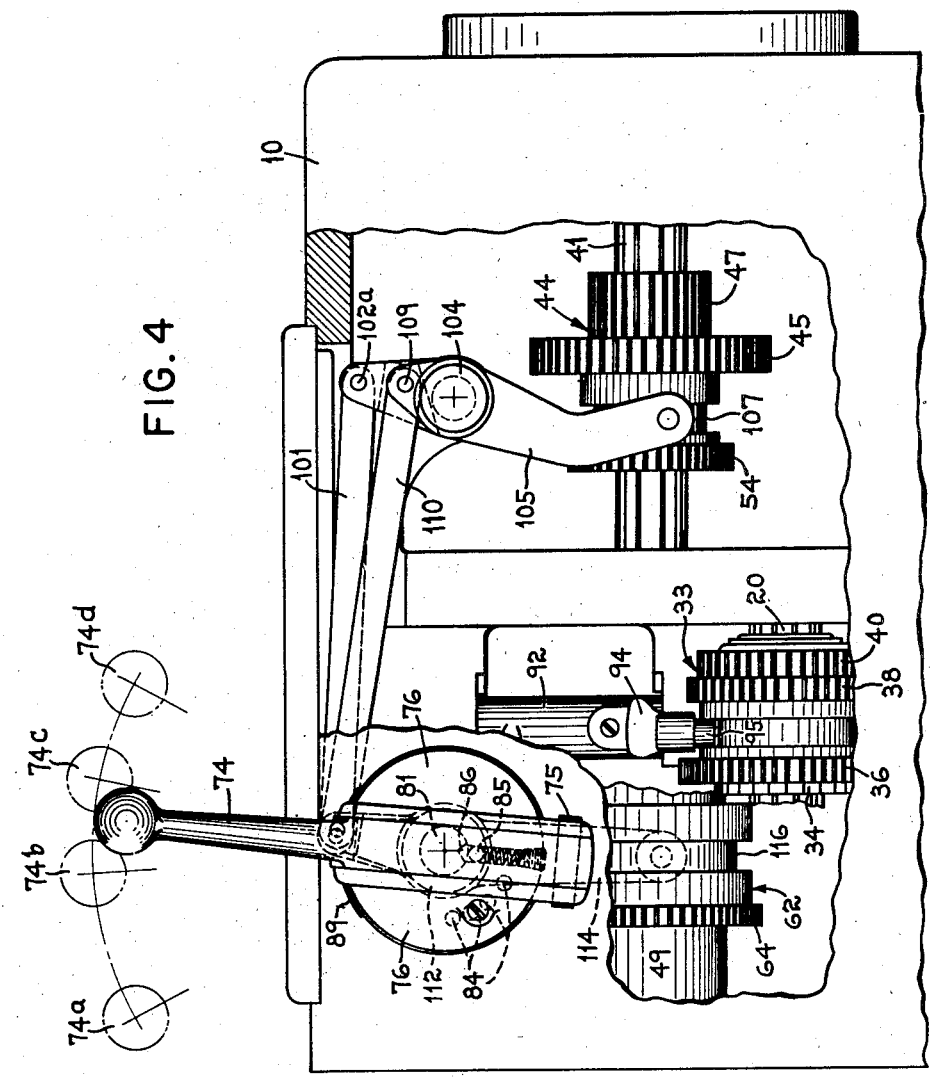

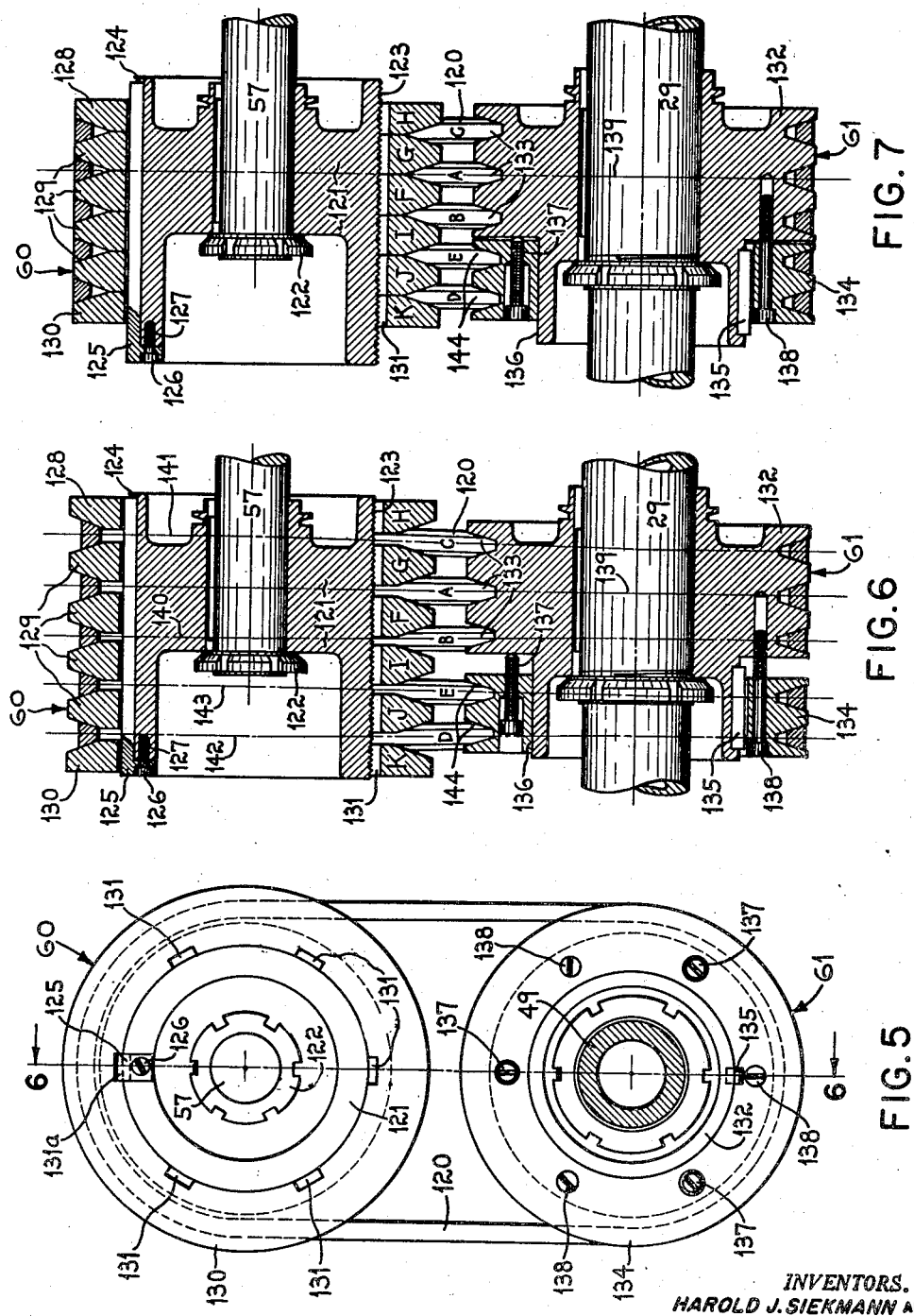

Patented Sept. 26, 1950

2,523,397

UNITED STATES PATENT OFFICE 2,523,397

CHANGE-SPEED GEARING FOR LATHE HEADSTOCKS

Harold J. Siekmann and George J. Kasselmann, Cincinnati, Ohio, assignors to The R. K. Le Blond Machine Tool Co., Cincinnati, Ohio, a corporation of Delaware Application September 10, 1948, Serial No. 48,738

5 Claims. (Cl. 74—333)

This invention pertains to improvements in lathe headstock transmissions and is particularly directed to improvements in the arrangement of the gear train and driving transmission mechanism of the headstock.

In lathe headstock transmissions for metal turning machines, it is most important to provide a power transmission for the work spindle which has a wide range of speeds so as to adapt the machine to all of the various forms of work it may be put to. One of the objects of this invention is to provide an improved and simplified transmission gearing mechanism which is capable of providing 16 different spindle speeds for the headstock transmission.

Another object of this invention is to provide an improved gear train arrangement and shifting mechanism therefor for a lathe headstock capable of providing a wide variety of different spindle speeds.

Still another object of this invention is to provide a lathe headstock transmission with a high and low range of speeds, the high range of which is accomplished through a direct belt-drive to the work spindle.

Further features and advantages of this invention will appear from a detailed description of the drawings in which:

Figure 4 is a fragmentary front elevation of the lathe headstock transmission showing further details of the gear shifting mechanism.

Figure 5 is an end view of the belt drive transmission of the headstock indicated by the line 5—5 in Figure 1.

Figure 6 is a sectional view through the belt drive transmission indicated by the line 6—6 in Figure 5.

Figure 7 is a view similar to Figure 6 but showing the belts in fully stretched adjusted position.

Figure 1:
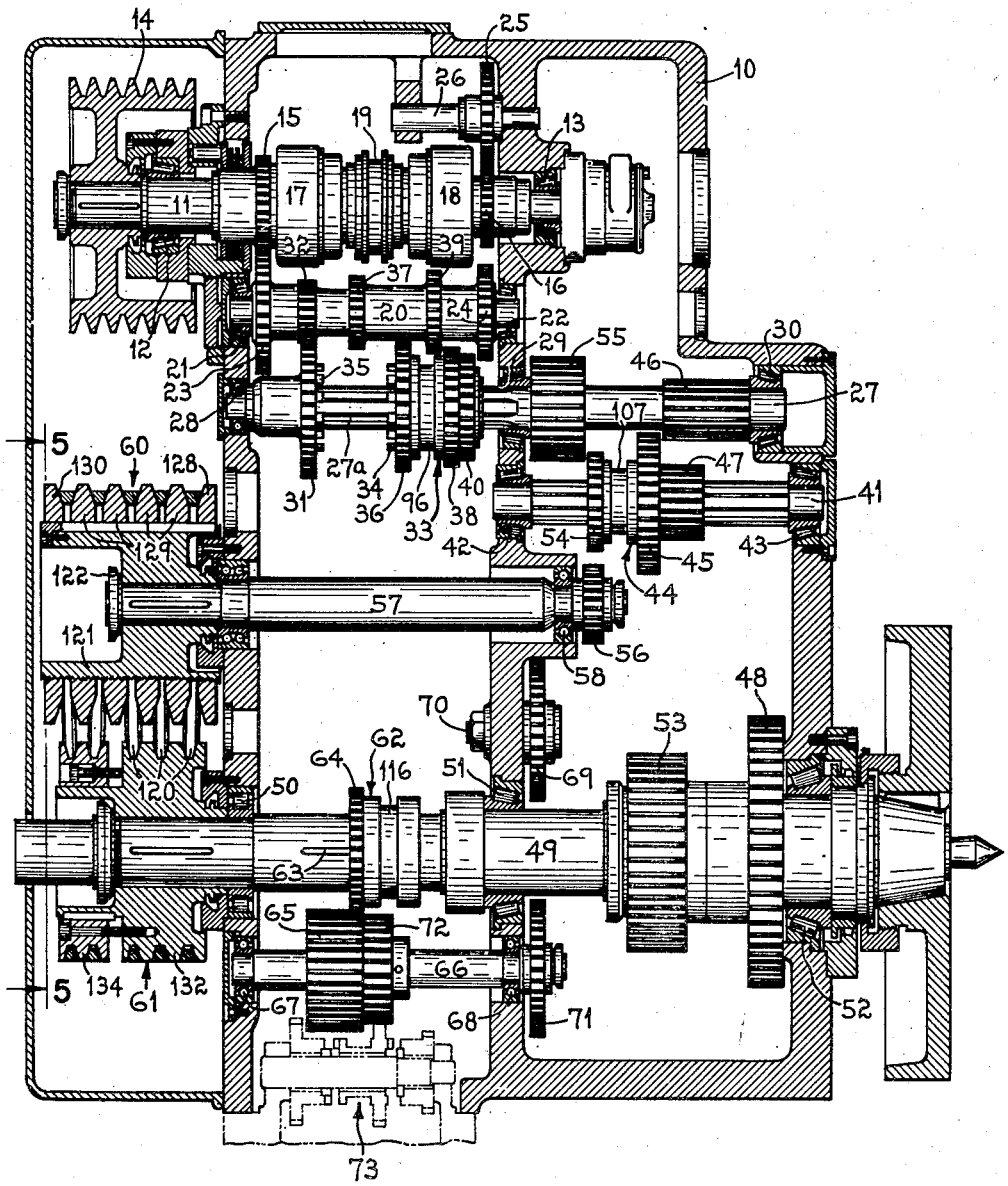
Figure 1 is a diagrammatic sectional view of a lathe headstock transmission incorporating the features of this invention.

As an exemplary embodiment of this invention there is shown, Figure 1, a headstock housing 10, which has an input shaft 11 suitably journalled on bearings 12 and 13 supported on the headstock housing 10. The input shaft 11 carries the main driving pulley 14 which is driven by suitable belted means from a main drive motor not shown. Journalled on the input shaft 11 are the gears 15 and 16 each of which may be respectively connected to or disconnected from the driving power from the input shaft 11 by clutches 17 and 18 actuated by the usual shifting spool 19. On a first intermediate shaft 20 journalled on suitable bearings 21 and 22 in the headstock housing 10 is the gear 23 which is in constant mesh with and driven by the gear 15 on the input shaft 11. A second gear 24 formed on the first intermediate shaft 20 is driven from the gear 16 on the input shaft 11 through an intermediate idler gear 25 journalled on a shaft 26 fixed in the headstock housing 10 so that by engaging one or the other of the clutches 17 and 18 the first intermediate shaft 20 may be caused to rotate in one direction or the other for thereby obtaining a reversing drive for the headstock transmission. The headstock transmission is stopped or started by energizing or de-energizing the main drive motor actuating the input pulley 14.

A second intermediate shaft 27 is journalled on suitable bearings 28, 29, and 30 in the headstock housing 10 and has journalled on it a gear 31 which is continuously in driving engagement with a gear 32 formed on the first intermediate shaft 20. On the spline portion 27a of the shaft 27 is slidably mounted in driving relationship a triple gear 33 having a clutch portion 34 adapted to engage a mating clutch portion 35 of the gear 31 when the gear 33 is shifted to its extreme left position, Figure 1. In this way the gear 31 drives through the triple gear 33, the shaft 27.

A gear 36 formed on the triple gear may be shifted into engagement with a gear 37 formed on the shaft 20. While the gear 38 of the triple gear may engage the gear 39 formed on the shaft 20 and finally the gear 33 may be shifted to its extreme right position, Figure 1, to engage its gear 40 with the gear 24 of the first intermediate shaft 20. Thus by shifting the triple gear 33 to the 4 positions above indicated four different speed changes may be applied from the shaft 20 to the second intermediate shaft 27.

A back gear shaft 41 is journalled on suitable bearings 42 and 43 in the headstock housing 10 and has a spline portion upon which is slidingly mounted the shiftable triple back gear 44. The triple gear 44 may be shifted to its extreme right position, Figure 1, so that its gear 45 will be in engagement with a gear 46 formed on the second intermediate shaft 27, and its gear 47 will be in engagement with the large face gear 48 fixed to the work spindle 49 of the lathe, the work spindle being journalled on suitable bearings 50, 51, and 52 in the headstock housing 10. The gear 44 may be shifted to a second position to the left, Figure 1, with the gear 45 still in engagement with the gear 46, but in which case the gear 45 is also shifted into position with a gear 53 on the work spindle 49. A third position still further to the left of the gear 44 brings its gear 54 into engagement with a gear 55 formed on the second intermediate shaft 27 while the gear 45 remains in engagement with the gear 53 on the work spindle 49.

A final high speed driving position is provided by shifting the triple gear 44 to extreme left position, Figure 1, in which case the drive is through the gear 55 to the gear 54 and then from the gear 45 to a gear 56 fixed on the belt drive shaft 57 journalled on suitable bearings 58 and 59 in the headstock housing 10. On the outer end of the belt drive shaft 57 is a V-belt pulley or sheeve 60 which drives through suitable belts a sheeve 61 fixed on the work spindle 49 so that in this speed the final high speed drive to the work spindle 49 is accomplished through direct belted driving means to the pulley 61 on this spindle.

It is also to be noted that in connection with the change from the three back gear ranges of speeds to the belt drive high speed that the feed drive is likewise slowed down in the high speed belt drive position. Normally in the three slower geared back geared drives to the spindle the feed gear 62 keyed in driving sliding relationship at 63 on the spindle 49 has a gear 64 which remains in driving engagement with a gear 65 on the feed shaft 66 journalled in suitable bearings 67 and 68 in the headstock housing 10. When the triple back gear 44 is shifted to the belt drive position with its gear 45 in driving engagement with the gear 56, its gear 54 also drives through a gear 69 journalled on a stud 70 in the headstock housing 10, a gear 71 fixed on the feed drive shaft 66, while the gear 64 is shifted to the extreme right position out of engagement with the gear 65. Thus, in this latter position the feed drive power comes from the second intermediate shaft through the triple back gear 44 and the work spindle 49 is eliminated from the feed drive transmission. This gives a reduced feed and also gives a positive drive around the belt drive at the high speeds to the feed drive train. Thus fine feeds at high belt speeds are obtained while the transmission automatically reverts to the normal direct spindle drive of the feed transmission in the three lower ranges of back gear speeds. A suitable power take-off gear 72 fixed to the shaft 66 and the gear 65 drives the feed mechanism indicated generally at 73 for actuation of the cutting tool by apparatus of a conventional and well known character.

Thus, by the appropriate sequential shifting of only two triple gears 33 and 44 sixteen driving speeds including a belt drive in the higher range is provided for the work spindle 49. By shifting the feed selector gear 62 in proper time sequence with the shifting of the aforementioned triple gears 33 and 44 the feed drive is automatically reduced while maintained positive in its driving action to the feed mechanism when the high speed belt-drive is cut in. It should be further noted that the simplicity of parts involved by this unique arrangement of a headstock transmission for accomplishing the sixteen driving speeds of this mechanism is provided in a most efficient and economical manner.

Figure 2:
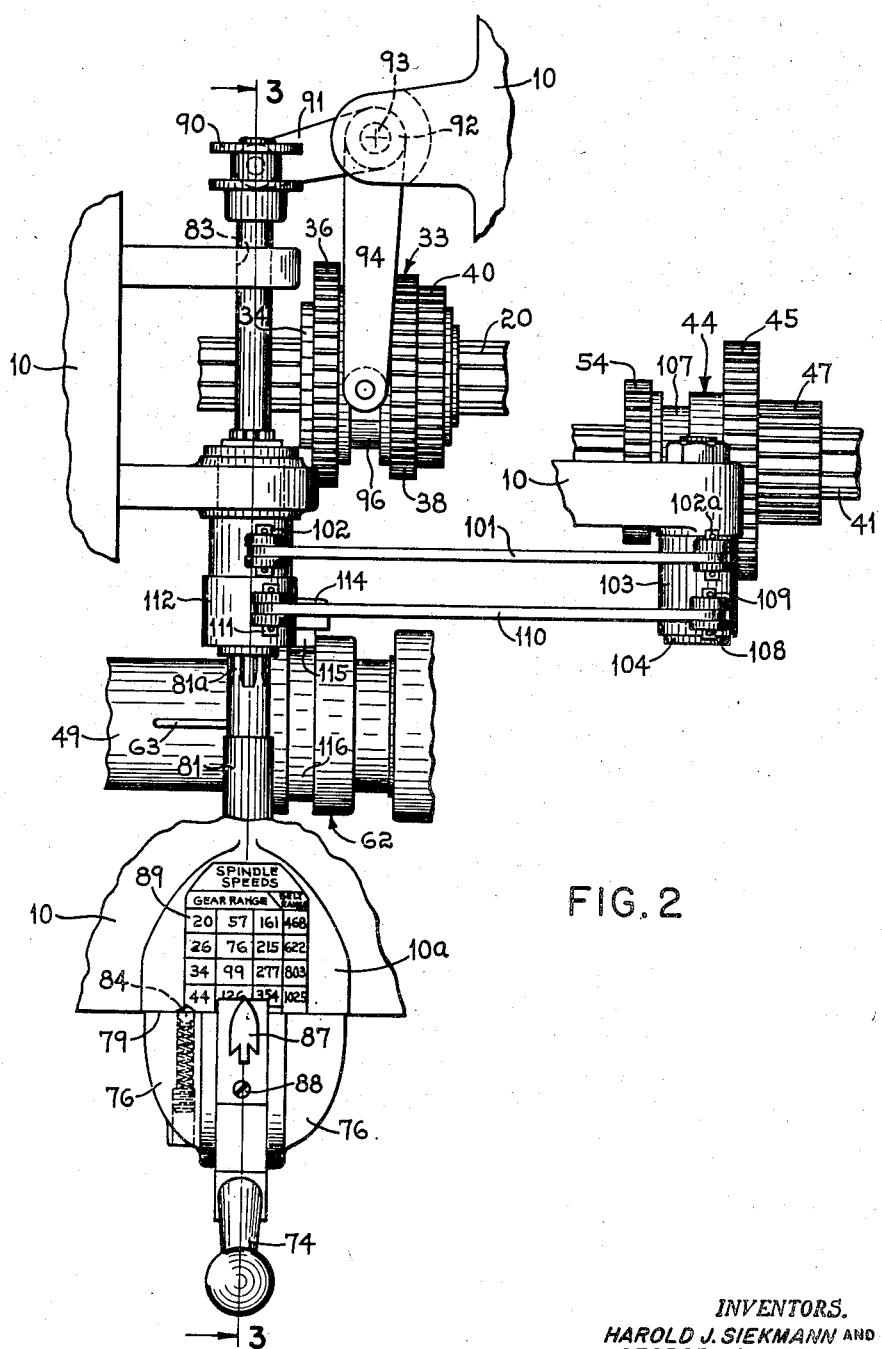
Figure 2 is a fragmentary diagrammatic view of the control lever and gear shifting mechanism of the headstock transmission of Figure 1.
Figure 3:
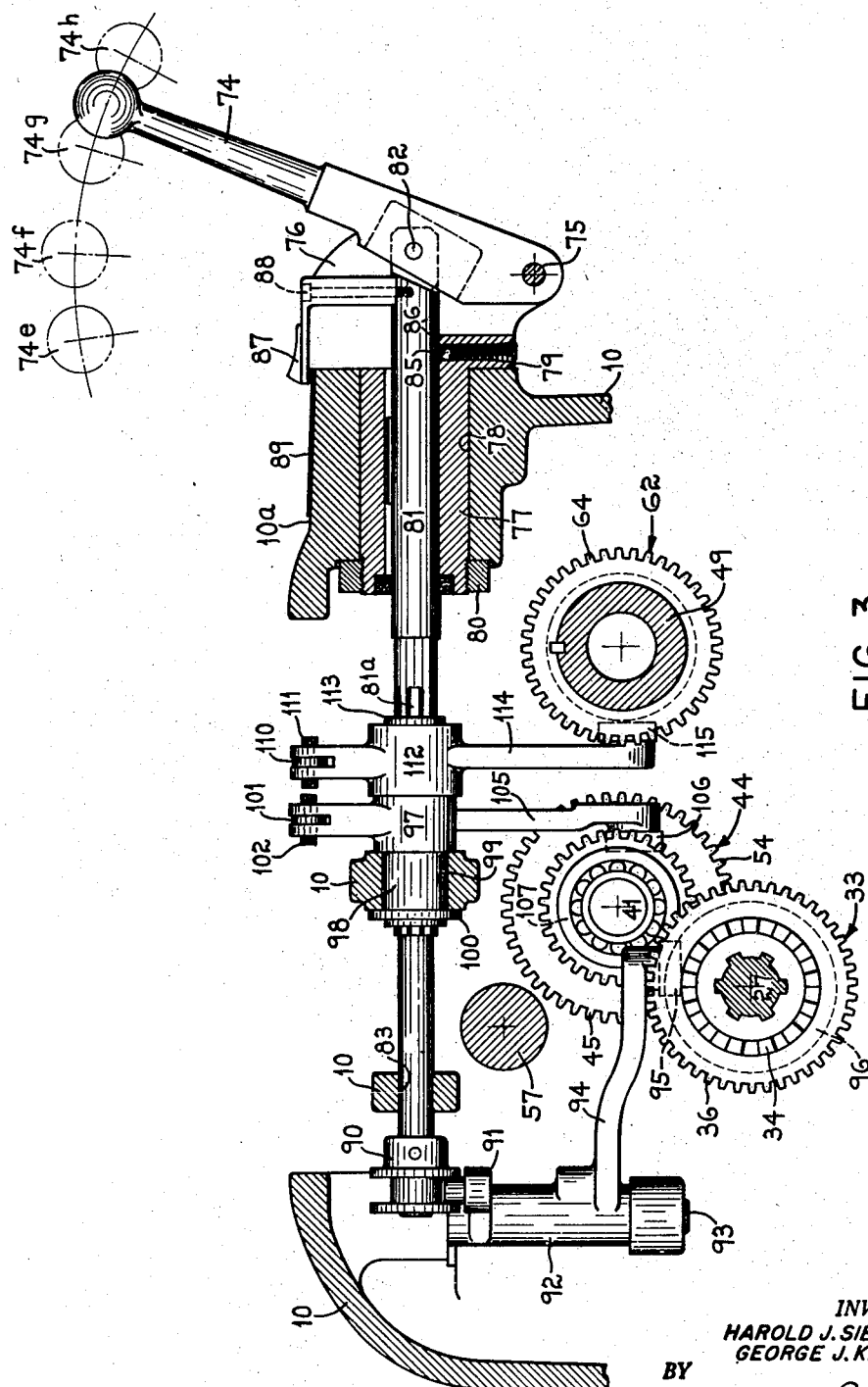
Figure 3 is a fragmentary section on the line 3—3 of Figure 2.

The gears 33, 44 and 62 are shifted in their proper sequential order by a single lever control mechanism shown in Figures 2, 3 and 4. This mechanism comprises a control lever 74 pivotally mounted at 75 on the bifurcated end portions 76 of the rocking sleeve 77 journalled in a suitable bearing 78 in the headstock housing 10 and confined against axial movement therein by abutment against the face 79 of the headstock 10 and by the lock nut 80 threaded to the inner end of the sleeve 77. Inside of the sleeve 77 is an axially movable rock shaft 81 which is pivotally connected at 82 to the lever 74 and extends inwardly of the headstock and is supported at its rear end in a suitable journal bearing 83 in the headstock 10. The shaft 81 may be rocked by the lever 74 to a series of positions 74a, 74b, 74c and 74d, Figure 4, by the rocking of the sleeve 77 in the bearing 78. The rock shaft 81 may be moved axially in and out to four positions by actuation of the lever 74 to the positions 74e, 74f, 74g and 74h, as seen in Figure 3. A suitable ball detent 84 locates the lever 74 in any of the four positions 74a to 74d inclusive, while a ball detent 85 carried in the sleeve 77 engages detent notches 86 of the rock shaft 81 to locate the control lever 74 in any of the four positions 74e to 74h inclusive.

Fixed to the rock shaft is an indicating pointer 87 by a suitable screw 88 so that the pointer 87 partakes of the rocking motion of the sleeve member 77 and also the in and out motion of the rock shaft 81. The pointer 87 is related to a suitable index plate 89 fixed on the surface 10a of the headstock housing 10 to show the selective speed obtained by positioning the lever 74.

The in and out motion of the lever 74 which axially shifts the rock shaft 81 is conveyed through a spool 90 fixed to the inner end of the rock shaft 81 to actuate the lever arm 91 of the bell crank shifter lever 92 journalled on a suitable shaft 93 fixed in the headstock 10. A second arm 94 formed integral with the bell crank lever 92 reaches out with a shoe 95 engaging in the annular groove 96 of the triple gear 33, so that axial shifting of the rock shaft 81 shifts the gear 33 to its four shiftable positions.

The rocking motion of the shaft 81 affected by moving the levers to positions 74a to 74d inclusive is conveyed through a lever 97 splined in sliding driving engagement with the spline portion 81a of the shaft 81, the member 97 also having an extended portion 98 journalled in a suitable bearing support 99 of the head stock housing 10 and held against axial movement therein by a suitable locking ring 100 so that the member 97 may rock in the journal 99 but is confined against axial movement relative to the headstock. The lever 97 has a link 101 pivotally connected to a pin 102, the other end of the link 101 being pivotally connected through a pin 102a to a shifter lever 103 pivotally mounted on a suitable stud 104 fixed to the headstock housing 10. The lever 103 has an arm 105 terminating in a shoe 106 operating in the annular groove 107 of the gear 44, so that when the lever 74 is moved to any of the positions 74a to 74d the gear 44 will be likewise shifted to any of its four positions for affecting the back gear or belt-drive of the lathe headstock. An arm 108 of the lever 103 is connected through a pin 109 to a link 110 which in turn is connected through a pin 111 to a lever 112 pivotally mounted against axial movement on an extension 113 of the member 98 and has a downwardly extending lever 114 terminating in a shoe 115 operating in the annular groove 116 of the shiftable gear 62 so that as the lever 74 is rocked to any of the positions 74a to 74d the feed gear speed change from high belt speed to back gear drive will be automatically affected. Thus the single lever 74 controls all of the sixteen speed changes and the feed rate change for the lathe headstock transmission.

Installation, removal and adjustment of the driving belts 120 between the pulley 60 and 61 is accomplished by unique arrangement shown best in Figures 5, 6, and 7. On the drive shaft 57 is fixed a pulley hub 121 by a suitable lock nut 122. The outer periphery of the hub 121 has a continuous thread 123 extending along its entire diameter. An axially extending keyway 124 adapted to receive a key 125 which is held in place by a suitable screw 126 threaded into the hub 121 at 127. On the outer threaded periphery of the hub 121 is a series of sheeve forming rings 128, 129 and 130, all of which may be rotated and moved along axially in any desired position on the periphery of the hub 121. Slots 131 are formed at six places in the threaded bores of the members 128, 129, and 130 so that they may be rotated to bring a series of slots in alignment as at 131a, Figure 5, and the key 125 inserted therethrough as shown in Figure 6 to lock all of the collars 128, 129 and 130 in desired axial driving position on the hub 121.

On the driven spindle 49 is fixed a pulley hub 132 of the pulley 61 which has a series of three feed belt grooves 133 formed therein. A second pulley member 134 is axially slidable in driving engagement through a key 135 on the diameter portion 136 of the pulley hub 132. Abutment screws 137 and draw in screws 138 serve to accurately axially position the pulley member 134 and to lock it into any adjusted axial position.

Thus, by removing the various rings 128, 129 and 130 from the pulley hub 121 the various V-belts 120 may be readily installed on or removed from the shafts 49 and 57 without disturbing their center distances on their journal bearings. When the belts are new and just have been placed on the pulleys as shown best in Figure 6, the two pulley assemblies assume the relationship shown. Belt A is positioned in perfect alignment with both pulleys along the line 139, while belts B and C are slightly divergent with regard to the lines 140 and 141 at the pulley 60. The remaining belts D and E are also slightly divergent along the lines 142 and 143 toward the pulley 60. The pulley 134 is moved to maintain this general relationship of the belts D and E with regard to the V-grooves 144 and the grooves formed in the pulley 60. After the belts wear and it is desired to take up tension in them, the two sheeve forming collars F and G are moved toward each other as shown in Figure 7, still maintaining the exact alignment of the belt A along the line 139 for both pulleys 60 and 61. The outer collar 128 marked H is moved inwardly to the left as shown in Figure 7 while the collar I is moved toward the right toward the collar F which results in a slightly convergent condition of the belt 120 toward the pulley 60. The sheeve forming ring J is moved up against the ring I while the final ring K is moved up toward the ring J as seen in Figure 7. At the same time the pulley member 134 is moved to the right, Figure 7, to maintain a condition of slight convergence of the belts D and E toward the pulley 60. Thus a wide range of selection of belt tensions may be obtained while at the same time avoiding the necessity of disturbing the shaft center distances or dismounting them in any way from the journal bearings and at the same time maintaining substantial correct alignment of the belts in approaching and receding from the V-grooves in the pulleys.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a lathe headstock transmission, a work spindle, a large diameter face gear on said work spindle, a second smaller gear on said work spindle, and a belt drive transmission for actuating said work spindle, an input shaft, a first intermediate shaft, a forward and reverse driving connection from said input shaft to said first intermediate shaft, a second intermediate shaft, a gear journaled on said second intermediate shaft and constantly driven from a gear on said first intermediate shaft, a shiftable triple gear mounting in sliding driving connection on said second intermediate shaft selectively engageable with a series of three mating gears on said first intermediate shaft, a back gear shaft, a back gear triple gear axially shiftably mounted on said back gear shaft having a small gear, an intermediate gear, and a large gear formed thereon, a small diameter wide faced gear on said second intermediate shaft, a larger diameter wide faced gear formed on said second intermediate shaft, said back gear triple gear being shiftable to a plurality of positions wherein the large gear of said back gear triple gear at one time engages the small wide face gear on said second intermediate shaft while the small gear of said triple gear engages said large diameter face gear on said work spindle, in a second shaft position said large gear remains in engagement with the small wide faced gear of the second intermediate shaft while engaging said second smaller gear on the work spindle, and shiftable to third position where the intermediate gear of said back gear triple gear is driven from the larger diameter gear of the second intermediate shaft while the large gear of the back gear triple gear maintains driving engagement with the smaller gear on the work spindle, and shiftable to a fourth position wherein the back gear triple gear continues to be driven from the larger diameter gear of the second intermediate shaft while its large diameter gear drives a belt drive transmission for actuating the work spindle.

2. In a lathe headstock transmission, a work spindle, a large diameter face gear on said work spindle, a second smaller gear on said work spindle, a belt drive transmission for actuating said work spindle, feed mechanism, and a regulating gear operable to drive said feed mechanism, an input shaft, a first intermediate shaft, a forward and reverse driving connection from said input shaft to said first intermediate shaft, a second intermediate shaft, a gear journalled on said second intermediate shaft and constantly driven from a gear on said first intermediate shaft, a shiftable triple gear mounting in sliding driving connection on said second intermediate shaft selectively engageable with a series of three mating gears on said first intermediate shaft, a back gear shaft, a back gear triple gear axially shiftably mounted on said back gear shaft having a small gear, an intermediate gear, and a large gear formed thereon, a small diameter wide faced gear on said second intermediate shaft, a larger diameter wide faced gear formed on said second intermediate shaft, said back gear triple gear being shiftable to a plurality of positions wherein the large gear of said back gear triple gear at one time engages the small wide face gear on said second intermediate shaft while the small gear of said triple gear engages said large diameter face gear on said work spindle, in a second shaft position said large gear remains in engagement with the small wide faced gear of the second intermediate shaft while engaging said second smaller gear on the work spindle, and shiftable to third position where the intermediate gear of said back gear triple gear is driven from the larger diameter gear of the second intermediate shaft while the large gear of the back gear triple gear maintains driving engagement with the smaller gear on the work spindle, and shiftable to a fourth position wherein the back gear triple gear continues to be driven from the larger diameter gear of the second intermediate shaft while its large diameter gear drives said belt drive transmission for actuating the work spindle and said regulating gear operable to drive said feed mechanism directly from the work spindle in the first three aforementioned shift positions for the back gear triple gear and to drive the said mechanism in the fourth belt-drive position directly from the second intermediate shaft.

3. In a lathe headstock transmission having, a work spindle, and feed mechanism actuated from said transmission, an input shaft, a first intermediate shaft, a forward and reverse driving connection between said input and first intermediate shafts, a second intermediate shaft, gearing means affecting a plurality of speed changes between said first intermediate shaft and said second intermediate shaft, and back gearing and belt driving connections between said second intermediate shaft and said work spindle, a feed rate change drive to said feed mechanism of the lathe, a back gear shaft, a back gear triple gear having small, intermediate and large gears formed thereon axially shiftable on said back gear shaft to a series of four positions, a small and a large wide faced gear on the second intermediate shaft, a small and a large gear on said work spindle, and a belt drive gear selectively engageable by shifting of said back gear triple gear, a belt drive shaft carrying said belt drive gear, feed change gearing in said feed mechanism interconnectable with said spindle or with said second intermediate shaft by shifting of said back gear triple gear, and a belt driving connection from said belt drive shaft to said work spindle.

4. In a lathe headstock transmission having, a work spindle, an input shaft, a first intermediate shaft means for driving said first intermediate shaft from said input shaft, a second intermediate shaft, change speed gearing means between said first and said second intermediate shafts for affecting a plurality of different speeds in said second intermediate shaft, small and large output gears on said second intermediate shaft, small and large input gears on the work spindle of said lathe headstock transmission, a belt drive for said spindle including a belt drive shaft, an input gear on said belt drive shaft, and a pulley on said belt drive shaft connected through suitable belt means to a belt pulley on the work spindle, and a back gear shaft having a shiftable back gear triple gear mounted thereon adapted to selectively engage the output gears on the intermediate shaft, the input gears on the work spindle and the gear on the belt drive shaft to provide a series of three back gear drive connections and a belt drive connection to the work spindle.

5. In a lathe headstock transmission having, a work spindle, an input shaft, a first intermediate shaft means for driving said first intermediate shaft from said input shaft, a second intermediate shaft, change speed gearing means between said first and said second intermediate shafts for affecting a plurality of different speeds in said second intermediate shaft, small and large output gears on said second intermediate shaft, small and large input gears on the work spindle of said lathe headstock transmission, a belt drive for said spindle including a belt drive shaft, an input gear on said belt drive shaft, and a pulley on said belt drive shaft connected through suitable belt means to a belt pulley on the work spindle, and a back gear shaft having a shiftable back gear triple gear mounted thereon adapted to selectively engage the output gears on the intermediate shaft, the input gears on the work spindle and the gear on the belt drive shaft to provide a series of three back gear drive connections and a belt drive connection to the work spindle, and a feed drive mechanism for the lathe having gearing means directly connecting driving power from said spindle to the feed mechanism when the shiftable back gear triple gear is in any of the three back gear drive positions and disengageable when the shiftable back gear triple gear is in belt drive position of engagement with the gear on the belt drive shaft, and means when said last mentioned drive is in effect to drive the feed mechanism of said lathe from said second intermediate shaft.

HAROLD J. SIEKMANN.
GEORGE J. KASSELMANN.

REFERENCES CITED

The following references are of record in the file of this patent:

UNITED STATES PATENTS

| Number | Name | Date |
|---|---|---|
| 1,881,028 | Meyer | Oct. 4, 1932 |
| 1,947,862 | Lucas | Feb. 20, 1934 |
| 2,197,893 | LeBlond et al. | Apr. 23, 1940 |
| 2,239,443 | Groene et al. | Apr. 22, 1941 |
| 2,247,491 | Groene | July 1, 1941 |
| 2,253,921 | Van Sant | Aug. 26, 1941 |
| 2,338,121 | LeBlond | Jan. 4, 1944 |